United States Patent [19]

Longenecker

[11] 4,389,124
[45] Jun. 21, 1983

[54] DEVICE FOR MONITORING SELECTED OPERATING CONDITIONS OF COMBUSTION WITHIN A SOLID FOSSIL FUEL BURNING FURNACE

[76] Inventor: Bruce A. Longenecker, 7826 Hartman Rd., Wadsworth, Ohio 44281

[21] Appl. No.: 264,277

[22] Filed: May 18, 1981

[51] Int. Cl.³ .......................... G01K 7/20; G01K 7/22
[52] U.S. Cl. ........................... 374/147; 73/183; 340/762
[58] Field of Search .............. 73/343 R, 362 AR, 359; 432/32; 374/147, 183; 340/762

[56] References Cited

U.S. PATENT DOCUMENTS

| | | | |
|---|---|---|---|
| 1,618,474 | 2/1927 | Potter | 73/343 |
| 4,050,308 | 9/1977 | Lee | 73/362 AR |
| 4,097,857 | 6/1978 | Miyakawa | 340/762 |
| 4,148,220 | 4/1979 | Spofford | 73/362 AR |

*Primary Examiner*—S. Clement Swisher
*Attorney, Agent, or Firm*—Hamilton, Renner & Kenner

[57] ABSTRACT

A device (10) for monitoring selected operating conditions of combustion within a solid fossil fuel burning furnace having a discharge flue includes a circuit (12) for monitoring the instantaneous temperature in the flue and providing a signal proportional thereto, and a visual status indicator (35) having a plurality of light emitting diodes (40–44). The number of light emitting diodes (40–44) emitting illumination at a given time is indicative of the selected operating conditions of combustion within the furnace.

5 Claims, 2 Drawing Figures

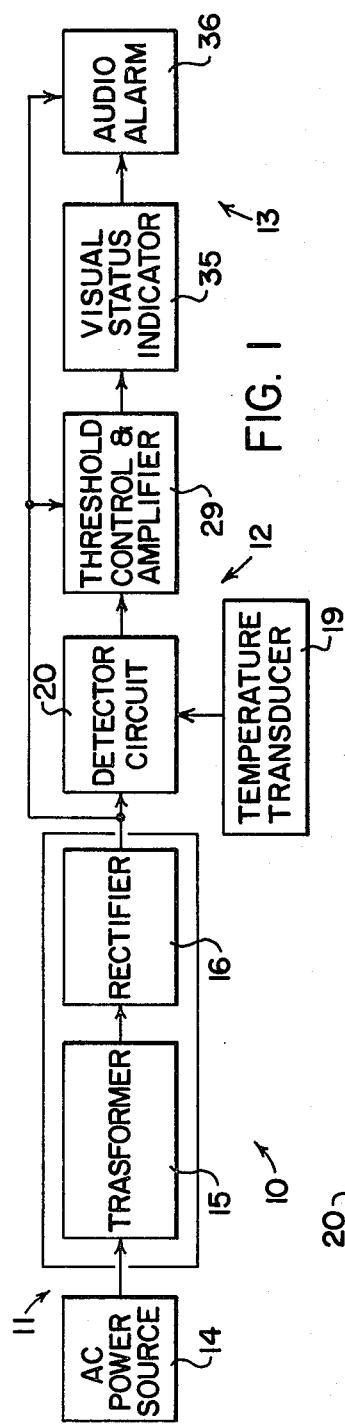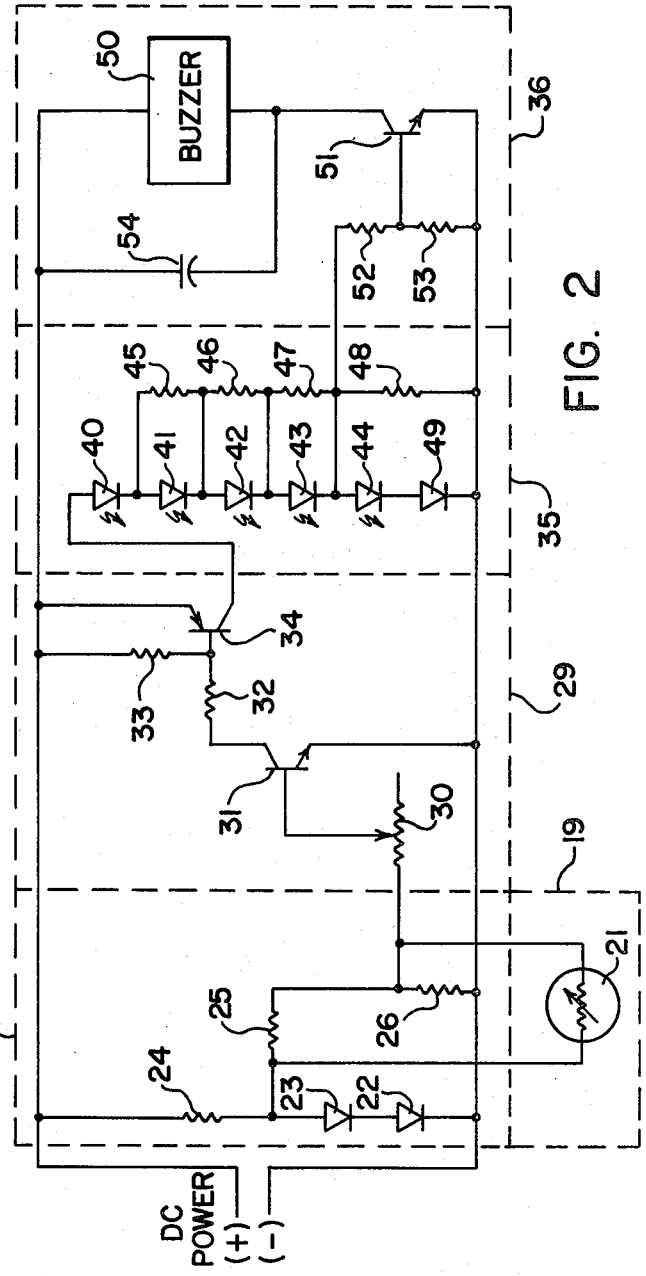

DEVICE FOR MONITORING SELECTED OPERATING CONDITIONS OF COMBUSTION WITHIN A SOLID FOSSIL FUEL BURNING FURNACE

TECHNICAL FIELD

The present invention relates generally to fossil fuel burning stoves and furnaces. More particularly, the present invention pertains to a device for monitoring operating conditions of the combustion within wood or coal burning stoves or furnaces.

BACKGROUND ART

Users of stoves and furnaces which burn solid fossil fuels as wood or coal (collectively referred to hereinafter as wood burning furnaces) have long had to contend with their deleterious safety aspects (such as creosote fires in the discharge flue) and their need for constant attention to properly control combustion and insure that the correct amount of fuel and oxygen is present. In recent times as the cost of electricity and natural gas has markedly increased, more people have begun using wood burning furnaces as economical supplemental or principal heating in environments as non-farm homes. In these environments the furnaces are commonly located remote from the usual places at which users spend the bulk of their time, substantially increasing the likelihood that combustion may cease without the immediate awareness of the user, possibly precipitating other damage to the structure or its contents before suitable temperatures may be restored. Moreover, no matter where its installed location, a furnace heretofore had to be physically inspected for safety reasons and to insure continual heating operations. Significant amounts of energy would almost inevitably be released with each inspection, often involving physically opening an access to the furnace combustion chamber.

To combat one of the most dangerous of the safety hazards presented by wood burning furnaces, the creosote flue fire, a type of monitoring device was developed which simply provides an alarm when the flue temperature exceeds some preselected flash point. However, since, depending upon creosote buildup, fires may occur in the flue somewhat irrespective of furnace combustion conditions (e.g., temperature, flame, combustion rate, fuel/air ratio, etc.), such devices cannot furnish the user with any information regarding the operating conditions of combustion within the furnace.

DISCLOSURE OF INVENTION

It is, therefore, an object of the invention to provide a device for monitoring the operating conditions of combustion within a solid fossil fuel burning furnace and furnishing a visual and/or audible indication of the same.

It is another object of the invention to provide a device for monitoring the operating conditions of combustion within a solid fossil fuel burning furnace, as set forth above, that provides visual and/or audible safety warnings of an imminent loss of combustion.

It is still another object of the invention to provide a device for monitoring the operating conditions of combustion within a solid fossil fuel burning furnace, as set forth above, that provides visual and/or audible safety warnings of a fire in the furnace discharge flue.

It is yet another object of the invention to provide a device for monitoring the operating conditions of combustion within a solid fossil fuel burning furnace, as set forth above, in which the aforementioned indications and warnings are furnished at any desired location remote to the furnace, eliminating the necessity to physically go to the furnace to check its operating conditions.

It is a further object of the invention to provide a device for monitoring the operating conditions of combustion within a solid fossil fuel burning furnace, as set forth above, in which the combustion operating conditions may be ascertained without physically opening or inspecting the furnace with attendant loss of energy.

It is still a further object of the invention to provide a device for monitoring the operating conditions of combustion within a solid fossil fuel burning furnace, as set forth above, in which the aforesaid indications permit closer control of combustion efficiency by suitably responsive modification of the fuel arrangement in the combustion chamber and air and fuel supplies.

It is yet a further object of the invention to provide a device for monitoring the operating conditions of combustion within a solid fossil fuel burning furnace, as set forth above, that is inexpensive, easy to install and automatic in operation.

These and other objects and advantages of the present invention over existing prior art forms will become more apparent and fully understood from the following description in conjunction with the accompanying drawings.

In general, a device for monitoring a solid fossil fuel burning furnace having a discharge flue includes means for monitoring and providing a signal proportional to the temperature in the discharge flue, and means for receiving the signal from the means for monitoring and providing a visual indication of selected operating conditions of combustion within the furnace.

BRIEF DESCRIPTION OF THE DRAWINGS

FIG. 1 is a block diagram of an exemplary device according to the concept of the present invention.

FIG. 2 is a schematic diagram of those portions of the device depicted in FIG. 1 other than the power supply.

PREFERRED EMBODIMENT FOR CARRYING OUT THE INVENTION

FIG. 1 illustrates in block diagram form a device, generally indicated by the numeral 10, for monitoring and providing a visual indication of selected operating conditions of combustion within a solid fossil fuel burning furnace. Device 10 broadly includes power supply 11, temperature monitor circuit 12, and status indicator 13.

Power supply 11 may be any conventional power supply suitable for furnishing power necessary for proper operation of the remaining circuitry. Where this circuitry is designed for operation from a low-voltage direct current (D.C.) power supply and only a higher-voltage alternating current (A.C.) source of power 14 is available, power supply 11 may be designed to include a conventional transformer 15 for reducing the voltage to the necessary magnitude and a conventional rectifier 16 (having positive and negative output terminals) whose output is sufficiently regulated for compatibility with the remaining circuitry.

Temperature monitor circuit 12 includes a temperature transducer 19 and a detector circuit 20. Temperature transducer 19 may be any of the well known sensors one of whose output electrical characteristics, such as resistance, varies in a known manner with the temperature in the vicinity of the sensor. It has been found convenient to utilize a thermistor 21 (FIG. 2) as temperature transducer 19.

As best seen in the schematic of FIG. 2, detector circuit 20 includes two diodes 22, 23 electrically connected anode to cathode and in series with resistor 24, and voltage divider network resistors 25 and 26. The cathode of diode 22 is electrically connected to the negative terminal from rectifier 16, while the side of resistor 24 opposite that connected to the anode of diode 23 is connected to the positive terminal from rectifier 16. Resistors 25 and 26 are electrically connected together in series, the side of resistors 25, 26 joined respectively to the anode of diode 23 and to the negative terminal from rectifier 16. Thermistor 21 is connected in parallel with resistor 25.

For reasons explained below, temperature monitor circuit 12 may further include a threshold control and amplifier 29 which in turn includes potentiometer 30, npn-type transistor 31, resistors 32 and 33, and complementary pnp-type transistor 34. One end of the resistive element within potentiometer 30 is electrically connected to the junction between resistors 25 and 26. The wiper of potentiometer 30 is electrically connected to the base of transistor 31, the emitter and collector of transistor 31 being respectively electrically connected to the negative terminal of rectifier 16 and one end of resistor 32. The end of resistor 32 opposite that electrically connected to the collector of transistor 31 is electrically connected to both one end of resistor 33 and the base of transistor 34. The emitter of transistor 34 and the end of resistor 33 opposite that electrically connected to the base of transistor 34 are both electrically connected to the positive terminal of rectifier 16.

Status indicator 13 includes a visual status indicator 35 and, where desired, an audio alarm 36. Visual status indicator 35 includes a plurality of five conventional light emitting diodes (LEDs) 40–44, inclusive, electrically connected in series together anode to cathode, and a plurality of shunt resistors 45–48, inclusive. The anode of LED 40, which forms one end of the LED series, is electrically connected to the collector of transistor 34. The cathode of LED 44 which forms the opposite end of the LED series, is electrically connected to the anode of a diode 49 whose cathode is connected to the negative terminal of rectifier 16. Resistors 45–48, inclusive, are respectively electrically connected in parallel with LEDs 41, 42, 43 and the series combination of LED 44 and diode 49.

The skilled artisan will be well aware that LEDs, like conventional diodes, require a minimum junction voltage drop to be biased into a forward conducting state. Consequently, such individual should appreciate that by suitably selecting the resistances of resistors 45–48, only a preselected number of LEDs 40–44 will be illuminated for a given potential between the collector of transistor 34 and the negative terminal of rectifier 16 across which the LED series is effectively electrically connected.

Audio alarm 36 includes a conventional buzzer 50 suitable for operation from power supply 11, switching transistor 51 of the npn-type, resistors 52, 53 and capacitor 54. Resistors 52, 53 are electrically connected in series and together electrically connected in parallel across resistor 48. The base of transistor 51 is electrically connected to the joined ends of resistors 52 and 53, the emitter of transistor 51 connected to the negative terminal of rectifier 16 and its collector electrically connected to one input of buzzer 50. The remaining input of buzzer 50 is electrically connected to the positive terminal of rectifier 16. Capacitor 54 is electrically connected in parallel with buzzer 50.

Having described the detailed construction of device 10, its operation may now be delineated. Initially temperature transducer 19 is operatively connected to the discharge flue of the desired solid fossil fuel burning furnace in such manner suitable for the particular transducer selected. In the example herein wherein a thermistor 21 is employed as temperature transducer 19, thermistor 21 may simply be strapped to and in contact with the outside of the discharge flue. The remaining circuitry, which may be housed in a single enclosure, is positioned at any convenient location to permit the user to frequently observe visual status indicator 35 and readily hear audio alarm 36, for example as upon a television or a kitchen countertop. Thermistor 21 is electrically connected to detector circuit 20 as explained hereinabove, and transformer 15 is electrically connected to a suitable A.C. power source 14 as available at any conventional 120 volt A.C. duplex receptacle, whereupon operation of device 10 becomes completely automatic.

Detector circuit 20 functions as a simple voltage divider network with diodes 22 and 23 serving to establish a fixed voltage intermediate to that of the output from power supply 11 and ground potential. As the temperature of gases in the discharge flue changes, the resistance of thermistor 21 proportionately varies resulting in a similar change in the voltage at the joined ends of resistors 25 and 26.

Threshold control and amplifier 29 provides a signal to visual status indicator 35 whose voltage magnitude is zero when the temperature of thermistor 21 is below a preselected magnitude and is proportionate to the temperature of thermistor 21 when its temperature exceeds the preselected magnitude. Since the anode of diode 40 is electrically connected to the collector of transistor 34, the collector voltage of transistor 34 controls the operation of visual status indicator 35. The operational status of transistor 34 and its collector voltage is in turn controlled by transistor 31, the latter of which in conjunction with its adjustable base potentiometer 30 serves to set the minimum operational temperature of device 10.

So long as the temperature of thermistor 21 is such that the voltage at the joined ends of resistors 25 and 26 is less than a preselected magnitude as adjustably chosen by potentiometer 30, transistor 31 is biased into a cutoff state. Since the base current for transistor 34 is derived through the collector of transistor 31, when transistor 31 is biased into a cutoff state transistor 34 is inoperative, thereby insuring that visual status indicator 35 remains off.

However, when the temperature of thermistor 21 rises to a level such that the voltage at the joined ends of resistors 25 and 26 exceeds the preselected magnitude, transistor 31 is biased into its active state, its collector output varying substantially proportionately to the voltage magnitude at the joined ends of resistors 25 and 26. Because the collector output of transistor 31 forms one end of a voltage divider network including resistors 32 and 33 from which is derived the base input signal to transistor 34, as the collector output of transistor 31 varies the voltage magnitude of the collector output of transistor 31 likewise proportionately changes, impressing upon the anode of LED 40 a voltage proportional to the temperature of thermistor 21.

LEDs 40-44 of visual status indicator 35 form a series network over which is distributed the output voltage from the collector of transistor 34. Resistors 45-48 provide a ground path when the output voltage is insufficient to bias all LEDs into a conducting state, and should be selected so that LED 40 is illuminated whenever the aforementioned preselected threshold is reached and so that the desired correlation exists between the number of LEDs illuminated and the temperature in the discharge flue. Since the operative conditions of the combustion within a solid fossil fuel burning furnace will affect the temperature in the furnace discharge flue, a visual indication of that temperature in effect provides a visual indication of such conditions. For example, after the furnace is operating and when only LED 40 is illuminated the user will appreciate that combustion is about to cease and attention must be immediately given to the furnace.

Simultaneous illumination of LEDs 40 and 41 is indicative of a generally undesirable low-temperature, slow-burning fire. In a similar fashion the illumination of three, four or five LEDs respectively indicates preferred combustion conditions, a generally undesirable high-temperature, fast-burning fire, and hazardous combustion conditions such as a fire in the discharge flue, permitting the user to take whatever corrective action is preferred.

The sounding of audio alarm 36 occurs only when hazardous combustion conditions, as a flue fire, exist and is triggered only upon the activation of LED 44. When LED 44 is biased into conduction the voltage drop across resistor 48 is sufficient to bias, through resistors 52 and 53 acting as a voltage divider, transistor 51 into saturation, activating buzzer 50 by effectively electrically connecting buzzer 50 to ground. Diode 49 serves to provide and additional voltage drop across resistor 48 such that the total voltage drop thereacross is adequate for the noted operational control of transistor 51. Capacitor 54 may be inserted in parallel across buzzer 50 where additional filtering of the output from rectifier 16 is desirable.

It should be appreciated that the particular configuration of detector circuit 20 and threshold control and amplifier 29 may alter significantly dependent upon the temperature transducer selected. Indeed, there may not even exist a need to amplify the output signal from detector circuit 20. Moreover, the skilled artisan will appreciate numerous other schemes for visually and/or audibly indicating the status of some electrical signal characteristic that may be suitable for inclusion in device 10 in place of the exemplary described visual status indicator 35 and audio alarm 36.

Inasmuch as the present invention is subject to many variations, modifications and changes in detail, a number of which have been expressly stated herein, it is intended that all matter described throughout this entire specification or shown in the accompanying drawings be interpreted as illustrative and not in a limiting sense. It should thus be evident that a device contructed according to the concept of the present invention, and reasonably equivalent thereto, will accomplish the objects of the present invention and otherwise substantially improve the art of monitoring the operational conditions of a solid fossil fuel burning furnace.

I claim:

1. A device for monitoring a solid fossil fuel burning furnace having a discharge flue, comprising:
   means for monitoring and providing a signal proportional to the temperature in the discharge flue;
   said means for monitoring including transducer means monitoring the temperature in the discharge flue and having a resistance proportional thereto;
   said means for monitoring also including circuit means providing a signal whose voltage is proportional to said resistance and detecting whether said voltage at least equals a preselected magnitude;
   said circuit means including adjustable base resistor means for selecting said predetermined magnitude, a first transistor detecting whether said voltage signal at least equals said preselected magnitude and thereupon providing an output signal proportional to said resistance, and a second transistor receiving and amplifying the output signal from said first transistor and providing a signal proportional to the temperature in the discharge flue; and,
   a plurality of light means for receiving said signal from said second transistor to provide a visual indication of selected operating conditions of combustion within the furnace, the number of said plurality of light means emitting illumination at a given time being indicative of the selected operating conditions of combustion within the furnace at that time.

2. A device, as set forth in claim 1, wherein said plurality of light means includes a plurality of light emitting diodes electrically connected in series, a like plurality of resistors being electrically connected in parallel therewith.

3. A device, as set forth in claim 2, further including audio means for generating an audio alarm when all said light emitting diodes are illuminating, said audio alarm indicative of hazardous combustion conditions as a fire in the discharge flue.

4. A device, as set forth in claim 3, wherein said audio means includes a sound generator and a transistor switch means electrically connected in parallel with one of said plurality of resistors for effectively electrically connecting said sound generator so as to generate said audio alarm upon the illumination of all said light emitting diodes.

5. A device, as set forth in claim 4, wherein said circuit means includes voltage divider means to which said transducer means is electrically connected for converting said resistance to said signal whose voltage is proportional to said resistance.

* * * * *